(12) United States Patent
Garcia Osma et al.

(10) Patent No.: US 10,567,857 B2
(45) Date of Patent: Feb. 18, 2020

(54) AUTO-PROVISION METHOD, A SYSTEM AND COMPUTER PROGRAM PRODUCTS FOR FTTH ACCESSES BASED ON SDN

(71) Applicant: TELEFONICA DIGITAL ESPAÑA, S.L.U., Madrid (ES)

(72) Inventors: Maria L. Garcia Osma, Madrid (ES); Alfonso Aurelio Carrillo Aspiazu, Madrid (ES); Carlos Ralli Ucendo, Madrid (ES); Daniel Velasco Benito, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 0 days.

(21) Appl. No.: 16/202,651

(22) Filed: Nov. 28, 2018

(65) Prior Publication Data

US 2019/0166415 A1 May 30, 2019

(30) Foreign Application Priority Data

Nov. 30, 2017 (EP) ..................................... 17382808

(51) Int. Cl.
*H04Q 11/00* (2006.01)
*H04L 12/24* (2006.01)

(52) U.S. Cl.
CPC ..... *H04Q 11/0067* (2013.01); *H04L 41/0806* (2013.01); *H04L 41/0886* (2013.01);
(Continued)

(58) Field of Classification Search
None
See application file for complete search history.

(56) References Cited

U.S. PATENT DOCUMENTS

| 8,774,629 B2 | 7/2014 | Wu et al. |
| 9,287,982 B2 | 3/2016 | Zang et al. |

(Continued)

FOREIGN PATENT DOCUMENTS

| EP | 2 887 566 A1 | 6/2015 | |
| EP | 3 148 112 A1 | 3/2017 | |
| EP | 3148112 A1 * | 3/2017 | ............... H04L 9/32 |

OTHER PUBLICATIONS

Frank Slyne, et al., "FLATANd: A Novel SDN-Based Telecoms Network Architecture Enabling NFV and Metro-Access Convergence", International Conference on Optical Network Design and Modeling (ONDM), IEEE, May 9-12, 2016, pp. 1-6 (Year: 2016).*

(Continued)

*Primary Examiner* — David W Lambert
(74) *Attorney, Agent, or Firm* — Sughrue Mion, PLLC

(57) ABSTRACT

The method comprises detecting, by an OLT when an ONU is connected to an optical termination point at a CPE of a user; notifying, by said OLT, a SDN controller; providing connectivity to said user to a dedicated and limited network providing access to a single self-provisioning web site by the SDN controller at least connecting said CPE to a service provider site; receiving, by the self-provisioning web site, credential information identifying the user on the self-provisioning web site, wherein the self-provisioning web site, once the user being connected therein, further receiving configuration information specifying which FTTH services the user wants to subscribe; and disconnecting, by the SDN controller, the user from the self-provisioning web site and reconnecting the user to a new network via a vCPE connected to said Internet service provider infrastructure and configured to provide access to Internet and to the subscribed FTTH services to the user.

14 Claims, 3 Drawing Sheets

(52) U.S. Cl.
CPC .. *H04L 41/5054* (2013.01); *H04Q 2011/0073* (2013.01); *H04Q 2213/05* (2013.01)

(56) References Cited

U.S. PATENT DOCUMENTS

| | | |
|---|---|---|
| 2007/0274720 A1 | 11/2007 | Menasco, Jr. et al. |
| 2012/0294613 A1 | 11/2012 | Hood et al. |
| 2017/0048218 A1* | 2/2017 | Lindemann ............. H04L 29/06 |

OTHER PUBLICATIONS

Frank Slyne, et al., "FLATANd: A Novel SDN-Based Telecoms Network Architecture Enabling NFV and Metro-Access Convergence", International Conference on Optical Network Design and Modeling (ONDM), IEEE, May 9-12, 2016, pp. 1-6 (Year: 2016).*

Frank Slyne, et al., "FLATANd: A Novel SDN-Based Telecoms Network Architecture Enabling NFV and Metro-Access Convergence", International Conference on Optical Network Design and Modeling (ONDM), IEEE, May 9-12, 2016, pp. 1-6.

European Search Report for EP 17 38 2808 dated May 14, 2018.

\* cited by examiner

AUTO-PROVISION METHOD, A SYSTEM AND COMPUTER PROGRAM PRODUCTS FOR FTTH ACCESSES BASED ON SDN

FIELD OF THE ART

The present invention relates to an auto-provision method, and corresponding system, for Fiber to Home (FTTH) accesses based on Software Defined Networking (SDN). The invention offers the means to subscribe and activate FTTH services in real time using SDN capabilities at an operator's customer portal.

BACKGROUND OF THE INVENTION

U.S. Pat. No. B2-9,287,982 introduces provision automatization by storing in the optical network unit (ONU) subscriber recognition information. This data has been previously provided by the network operator and it is introduced in the ONU by the subscriber. The ONU uses this information to connect to the network.

U.S. Pat. No. 8,774,629 is similar to the previous patent as it is based on the ONU capability to authenticate itself to the network. It is also quite similar to the mechanism currently implemented to connect FTTH customers, as ONU and optical liner terminal (OLT) ports are "paired".

US20070274720 proposes a mechanism to "lock" an ONU to an OLT port by using an identification mechanism based on a code that it is provided by the fiber technician.

US20120294613 introduces a mobile device that can register the information of the ONU (e.g. using RFID) and upload it to the provision system, which will register the ONU with the corresponding OLT port.

EP2887566A1 uses RFID tags to acquire the information required to connect the ONU to the network, streamlining the provision process.

Previously described references provide means to streamline the registration of the ONU with a given OLT port. However, they do not authenticate the user, but the ONU device itself. Additionally, existing registration procedures are limited and do not provide enhanced interactions with the user, such as enabling the customer to activate and deactivate FTTH service on-line or the modification of the service in real time.

All previous references authenticate the ONU in the network, but none of them authenticate the customer, thus requiring a registration of the equipment both the first time the service is activated and whenever the ONU is changed. On the contrary, present invention authenticates the user, so (s)he can activate the service and change or replace the ONU which was originally used to provision the service just by authenticating herself/himself in the subscriber portal, as the proposed method will automatically register the ONU used by the customer when he connected to the subscriber portal (this way, the ONU can be discovered during the process and included in the inventory systems once provisioning is successfully completed).

None of the prior art solutions provides connectivity until the FTTH service is fully provisioned and active. Therefore, the customer requires an alternative connection (e.g. mobile) or visiting a store to subscribe to the services. Instead, the proposed solution uses the already available FTTH network terminal connection to enable access to a walled garden where customers or non-customers can subscribe or activate services.

Furthermore, the customer would be able to take its ONU to a different location with FTTH access and be recognized by the BSS/OSS and their configuration be recovered and instantiated at the new location.

SUMMARY OF THE INVENTION

Present invention provides an auto-provision method for FTTH accesses based on SDN.

In an embodiment, the proposed method comprises detecting, by an OLT installed within an Internet service provider infrastructure when an ONU is connected to an optical termination point at customer premises equipment (CPE) of a user; notifying, by the OLT, a SDN controller installed at the Internet service provider infrastructure; connecting, by the SDN controller, said CPE to a service provider site enabling access to said user to a dedicated and limited network providing access to a single self-provisioning web site; receiving, by the self-provisioning web site, credential information identifying the user on the self-provisioning web site, wherein the self-provisioning web site, once the user being connected FTTH services the user wants to subscribe; and disconnecting, by the SDN controller, the user from the self-provisioning web site and reconnecting the user to a new network via a virtual customer equipment (vCPE) connected to said Internet service provider infrastructure and configured to provide access to Internet and to the subscribed FTTH services to the user/customer.

In another embodiment, the proposed method comprises detecting, by an OLT installed within an Internet service provider infrastructure when an ONU is connected to an optical termination point at a CPE of a user; notifying, by said OLT, a SDN controller installed at said Internet service provider infrastructure and sending, by the OLT, an event activating a temporary vCPE installed within the Internet service provider infrastructure; connecting, by the SDN controller, said temporary vCPE to said CPE and to a service provider site enabling access to said user to a dedicated and limited network providing access to a single self-provisioning web site; receiving, by the self-provisioning web site, credential information identifying the user on the self-provisioning web site, wherein the self-provisioning web site, once the user being connected therein, further receiving configuration information specifying which FTTH services the user wants to subscribe; and disconnecting, by the SDN controller, the user from the self-provisioning web site, removing the connection of the temporary vCPE with the CPE and reconnecting the user to a new network via a vCPE connected to said Internet service provider infrastructure and configured to provide access to Internet and to the subscribed FTTH services to the user.

According to this last embodiment, the connection of the temporary vCPE to the customer premises and to the service provider site is preferably performed via two different virtual local area networks (VLANs).

The credential information can be received, according to an embodiment, via an online registration of the user in the self-provisioning web site. Alternatively, the credential information can be received via an online or offline means provided by an operator of the dedicated and limited network.

According to the proposed method, the CPE can be configured either in bridge mode or in router mode. Moreover, the vCPE can be exclusive for the user or alternatively be shared among other users.

In an embodiment, upon the user has accessed to the subscribed FTTH services an identification number of the ONU is stored in a memory or database.

In an embodiment, a combination of a user identifier (e.g. a password), an identifier of the CPE and a network identifier such as an identification number of the ONU or of the OLT is used in order the user accessing the subscribed FTTH services in another optical termination point.

In an embodiment, a routing policy is applied upon the user has accessed to the subscribed FTTH services.

Other embodiments of the invention provide a system for auto-provision FTTH accesses based on SDN, comprising:
an Internet service provider infrastructure comprising an OLT, a SDN controller and a vCPE;
an optical termination point located at a CPE of a user;
an ONU; and
a service provider site.

According to the proposed system, the OLT is adapted and configured to detect when the ONU is connected to the optical termination point and to notify the SDN controller upon said detection, the latter being adapted and configured to provide connectivity to said user to a dedicated and limited network providing access to a single self-provisioning web site by at least connecting the CPE to the service provider site. Moreover, the self-provisioning web site is adapted and configured to receive credential information identifying the user on the self-provisioning web site and to, once the user is connected therein, further receive configuration information specifying which Fiber-to-the Home, FTTH, services the user wants to subscribe. Furthermore, the SDN controller is adapted and configured to disconnect the user from the self-provisioning web site and to reconnect the user to a new network via the vCPE to provide access to Internet and to the subscribed FTTH services to the user.

In an embodiment, the Internet service provider infrastructure further comprises a temporary vCPE adapted and configured to be connected to the CPE and to the service provider site in order the connection being provided by the SDN controller.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Therefore, according to the present invention, whenever there is a fibre termination point at CPE, a user will only need to plug a CPE/ONU device to enable network access. Initially, the provided connectivity will only enable access to a dedicated and limited network that provides access to a single self-provisioning web site (i.e. a walled garden environment), where the user will be able to activate the FTTH service and subscribe to any of the available service bundles (e.g. Video on Demand). To do so, the user will only need to identify herself/himself on the self-provisioning web site with her/his customer credentials to be provisioned as a new customer and get access to the subscribed services. Once the activation request has been successfully processed and the user is correctly provisioned with the service, SDN mechanisms will be used to disconnect the user from the walled garden and reconnect her/him to the actual network, by means of a vCPE, which will be configured and connected to provide access to Internet and the subscribed services.

Present invention will enable a differential customer experience, as users/customers will be able to auto-provision their fiber access in a matter of minutes without requiring a technician visit their homes neither a pre-activation/subscription to the service. Even in the cases when a technician's visit to the home is required to install the fiber drop, the method will be faster and straightforward as only the physical installation of equipment will be required, while service activation will not require any pre-provision tasks or previous interaction with the OSS/BSS systems.

BRIEF DESCRIPTION OF THE DRAWINGS

The previous and other advantages and features will be more deeply understood from the following detailed description of embodiments, with reference to the attached figures, which must be considered in an illustrative and non-limiting manner, in which.

DETAILED DESCRIPTION OF THE INVENTION AND OF SEVERAL EMBODIMENTS

Figure 1:
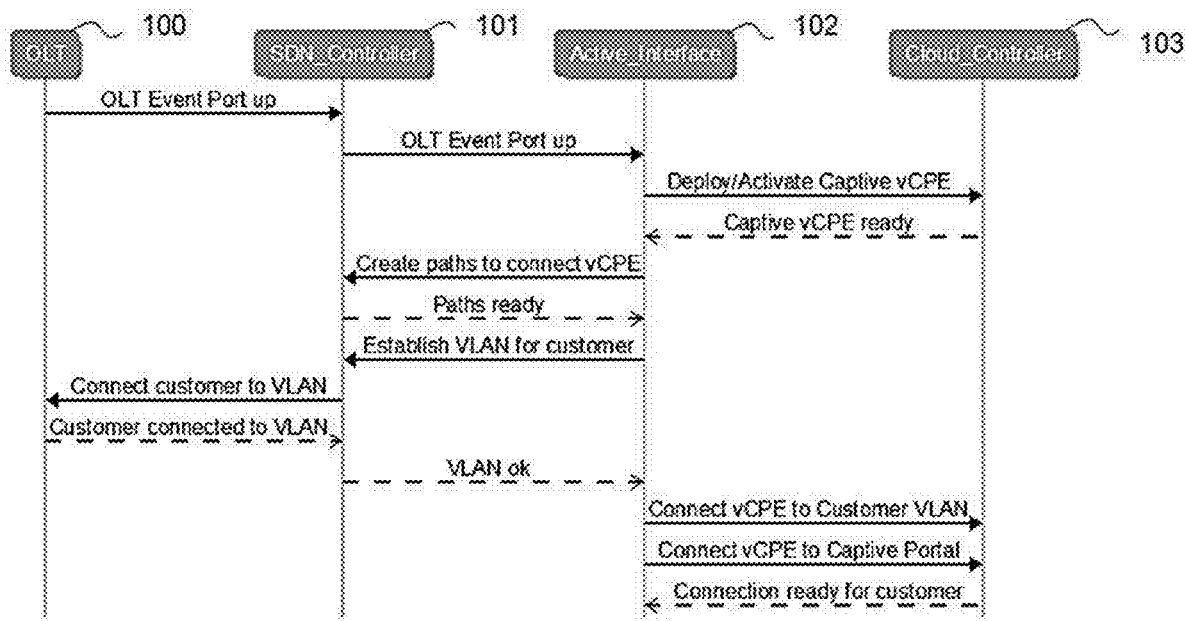
FIG. 1 is a flow chart illustrating the initial connection flow with the temporary vCPE, according to an embodiment.

Present invention provides an auto-provision method for FTTH (Fiber-To-The-Home) accesses based on SDN, where customers/users 10 can self-subscribe and provision the services using the optical connection available at their homes.

Given that there is already an optical termination point at the customer premises 45, the user 10 will only need to connect an ONU 41, homologated by a service provider, and a CPE, if both are not integrated in the same device. It is important to notice that current provision methods require the ONU 41 to be registered with an OLT 100, where it is going to be connected before the connection can be used. This way, current methods use the ONU device 41 as the only means to identify the user 10 and activate the service, whereas the proposed method uses user credentials to enable the access to the network. Therefore, a pre-registration of the ONU 41 is no longer required, as any ONU could be used to enable access to the service, given that it is either provided by the service provider or homologated as suitable equipment to be connected to the service provider FTTH network.

Once the user 10 has connected the ONU 41 to the optical termination point and the CPE to the ONU 41 (if both are not integrated), the user 10 can use it to access to a service provider on-line customer portal to activate or subscribe to the FTTH service: whenever a new device is connected to the network, an active interface will detect it and will use SDN capabilities (managed by a SDN controller 101) to build the paths between the OLT 100 and the captive portal to provide the user 10 with a limited connectivity. Even if the user 10 does not know the address of the on-line portal, it would not be an issue as the network will use DNS address resolution to redirect all the user web traffic to the customer portal and guide the user through the process, no matter which web page the user tries to access.

The CPE/integrated ONU 41 does not require of any advanced configuration. However it is recommended for the CPE to be configured in bridge mode as it will allow benefiting from the enhanced functionality that a vCPE 108 will provide once the user 10 is correctly provisioned. Equipment provided by the service provider could be pre-configured with these settings or detailed instructions could be provided to the customer, once the service is active to ensure a richer user experience.

The above should be considered not imitative as the CPE could be configured also in router mode.

The proposed method uses a combination of SDN and virtualization of customer equipment to achieve the previously described functionality: The OLT(s) 100 installed in the service provider infrastructure (e.g. the central office) 120 is/are configured to notify the SDN controller 101 whenever an ONU 41 is connected to an optical termination point in a customer premises 45, if the service has not been previous activated. Once an OLT 100 detects a new connection in a previously unused port, this will be notified to the SDN controller 101 (by any of the protocols supported by OLT 100) that will trigger the service activation logic.

Figure 2:
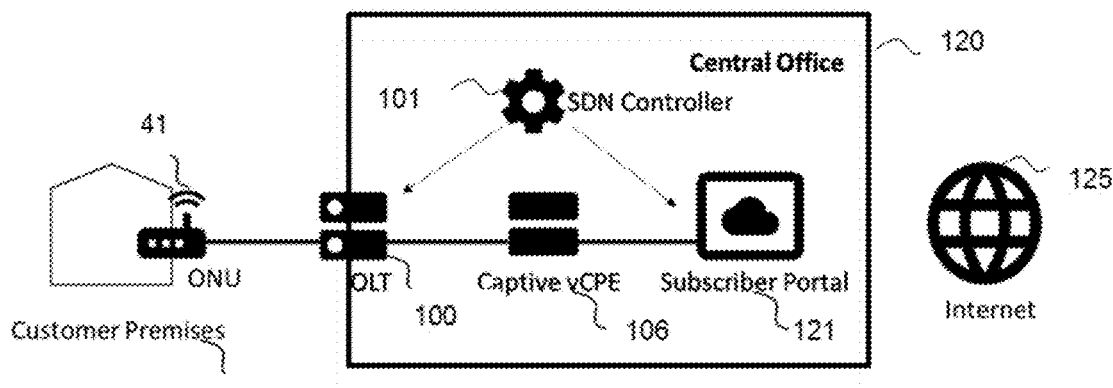
FIG. 2 schematically illustrates the temporary vCPE connections of the embodiment of FIG. 1.

As shown in FIGS. 1 and 2, according to a first embodiment, once this new connection has been detected, the OLT 100 will send an event that will lead to the instantiation or activation of a temporary vCPE ("Captive vCPE") 106 within the operator virtualized infrastructure. Then, the SDN Controller 101 will build the paths required to connect this temporary vCPE 106 both to the customer premises 45 and to the captive portal, using two different VLANs (of any type, either L2 VLANs or L3 VLANs such as VXLAN). This way, the (potential) user 10 will be connected to a temporary vCPE 106 that will only provide connectivity to a walled garden network with limited connectivity, where the user 10 will be only able to access the operator on-line portal to subscribe or activate services (i.e. a single self-provisioning web 121).

This way, the user 10 will have immediate connection to the service provider fibre network, but only to access the single self-provisioning web 121 (or subscriber portal, as show in FIG. 2). At this point, the user 10 can identify herself/himself as a customer or register as a new customer to subscribe or activate the different available FTTH services. However, the user 10 is not able to connect to neither Internet 125 nor any service as her/his connection is established within a walled garden.

Figure 3:
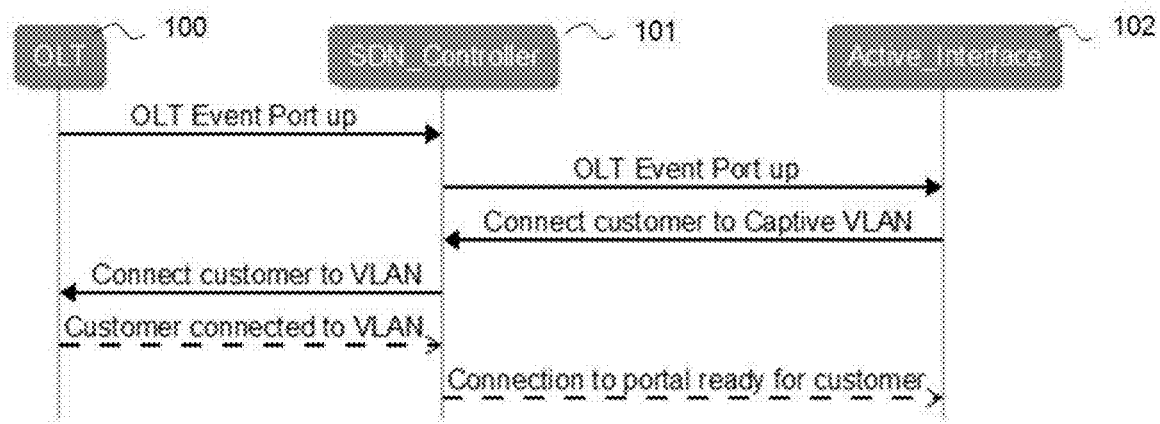
FIG. 3 is a flow chart illustrating the initial connection flow with direct connection to the self-provisioning web site or portal, according to an embodiment.
Figure 4:
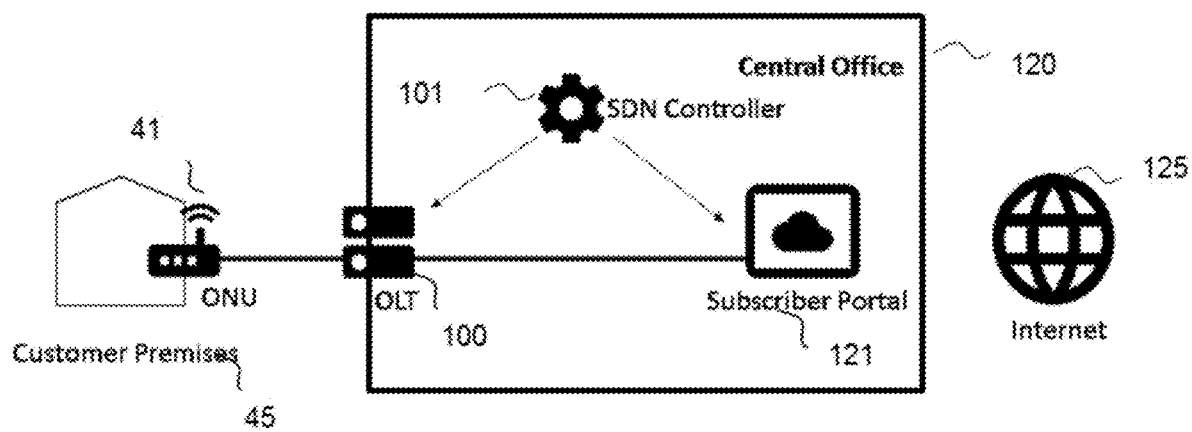
FIG. 4 schematically illustrates the connections of the embodiment of FIG. 3.

FIG. 3 shows an alternative, but analogous, implementation of the above first embodiment that consists on connecting the user 10 directly to the single self-provisioning web 121 without using a temporary vCPE 106. In this case, once the port up event has been detected, the SDN controller 106 would connect the customer premises to the single self-provisioning web 121 directly and it would be the web/portal which will provide the required configuration in addition to the means to subscribe and activate services. In this case, the user 10 will also have connection to the service provider fibre network, but only to access the single self-provisioning web 121 (or subscriber portal), as show in FIG. 4.

Figure 5:
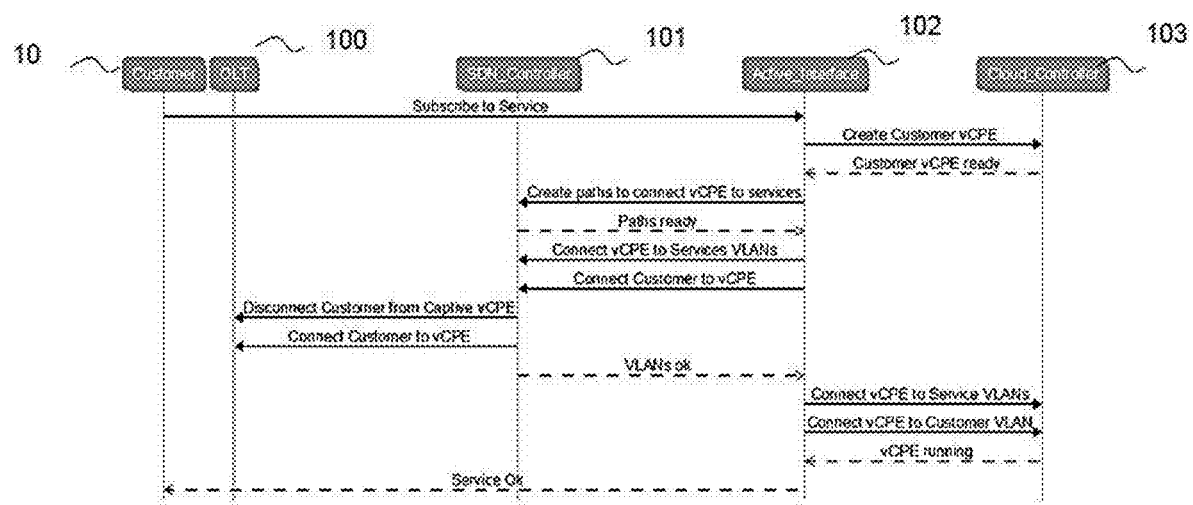
FIG. 5 is a flow chart illustrating the FTTH service activation flow.
Figure 6:
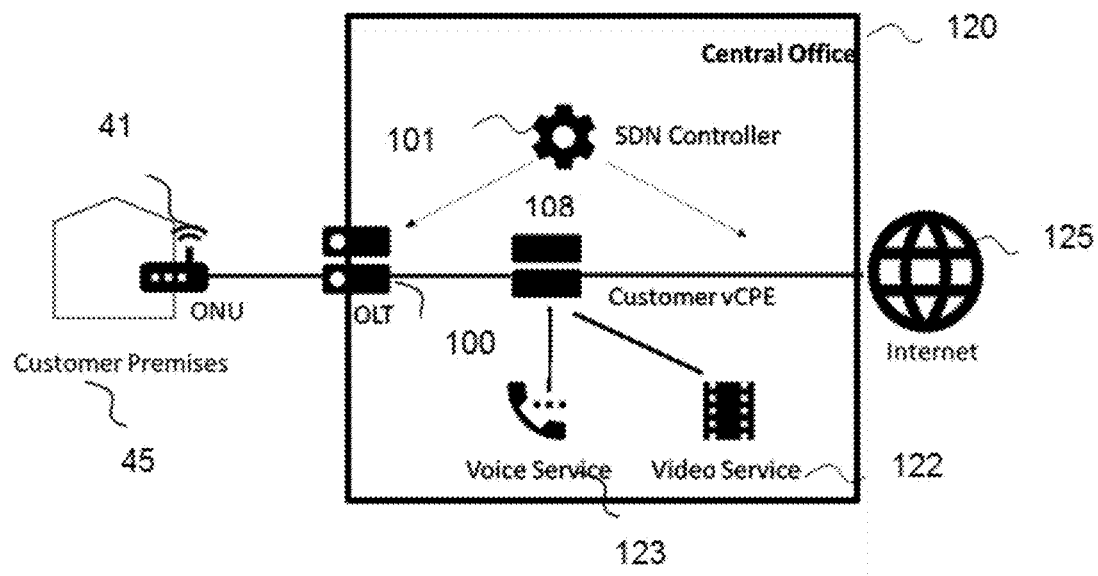
FIG. 6 schematically illustrates the user connections once the user has subscribed to the FTTH services.

Referring now to FIG. 5, when the user 10 connects to the single self-provisioning web 121 and subscribes to the selected FTTH services, the activation flow will begin and the new services will be available to the user in less than a certain period of time, preferably less than 3 minutes. The activation will require creating a (new, depending on the embodiment implemented) vCPE 108 for the user 10, configured with the subscribed FTTH services and customized with the chosen security/home network parameters. Once this vCPE 108 is deployed, the SDN controller 101 will build the paths to connect it to the subscribed FTTH services (e.g. video and/or voice).

According to the first embodiment, the last step will consist on removing the customer premises 45 connection to the temporary vCPE 106 and connecting it to the (new) vCPE 108, which provides access to Internet 125 and the corresponding FTTH services. The user 10 will be able to use different FTTH services, which could range from the no-frills connectivity with different bandwidth to voice 123, video 122 or even advanced services, such as firewalls or multiple services chained.

During the FTTH service provision process, the serial number of the ONU 41 will be preferably stored in a database (not shown), e.g. in the BSS of the service provider. This way, if a provisioned user disconnects from the network (e.g. turns off the ONU 41) without deactivating the service, the user 10 will not need to authenticate to access the service again, as the network will recognize the ONU 41 and provide access to the subscribed FTTH services.

In an embodiment, a combination of user, in-premise devices and network equipment information (e.g. an identifier of the user 10, of the CPE and of the network, or an identification number of the ONU 41 or of the OLT 100) could be used to optionally enable or disable user nomadism by which the user 10 can bring her/his FTTH service subscription to any fiber access the user 10 plugs the ONU 41 to.

Referring back to FIG. 5, although not shown in the figure, once the FTTH service is active, the temporary vCPE 106 will be removed from the virtualized infrastructure and all the unused paths deleted to free up the resources.

Present invention also enables operations such as suspending the service temporally, deactivating and activating it in a different location, where the user 10 will have access to all the FTTH services and configuration she/he had at her home/original location. Additionally, the user 10 will be able to activate new FTTH services or deactivate them at any time from any location given that she/he has Internet connectivity and can access the operator web portal.

In an embodiment, alternative of the initial connection process, a different configuration of the temporary vCPE 106 is used, to instead only providing access to the self-provisioning web site enable access to some operator services, such as video streaming or Internet connectivity for a limited period of time, to provide a trial of the service before subscribing.

By enabling a fast and automatized service provision and activation, the proposed method can also be used to provide pay-per-use services, such as video on demand. Moreover, the proposed method could also be used to provide VPN services for SMEs, by using SDN to securely connect remote customer premises to the customer network.

The presented implementation of the method has assumed that each user 10 has her/his own vCPE 108, but the method could also be implemented for multitenant/distributed vCPEs, where many different users share the same multitenant vCPE.

By leveraging in SDN approach, enhanced routing policies can be implemented to avoid all subscriber traffic going through vCPE 108. That would enable the concept of Intelligent Switching Fabric, which could absolve some functionality currently places on vCPE 108.

The proposed invention has a main advantage over state-of-the-art solutions as it provides the possibility for the user 10 to self-provision an FTTH access service in real time.

This cannot be done with current solutions, as either a technician has to visit the customer premises 45 or a manual activation of the customer equipment in the provision system is required in order to enable the FTTH service.

Furthermore, by enabling a provision method based on customer credentials instead of ONU 41 identification, a user 10 can replace her/his ONU 41 at any time without having to inform the service provider or requiring a pre-registration of the ONU 41. Moreover, the user 10 can use her/his ONU 41 to activate an FTTH Service in any location with an optical termination point provided by the service provider, as the fiber connection becomes a "FTTH-on-demand" service.

Additionally, it reduces the time to activate the service from days to minutes, enhancing a better customer experience.

Present invention mainly bases the customization of the FTTH service on an actual configuration of the vCPE 108 (e.g. different images for different services), with different implementations for different FTTH services. Therefore, the cost of deploying new FTTH services is reduced significantly and it enables the possibility of providing users with a highly personalized FTTH service offering in a very efficient manner.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

The invention claimed is:

1. An auto-provision method for Fiber-to-the-Home (FTTH) access based on Software Defined Networking (SDN), the auto-provision method, comprising:
   detecting, by an optical line terminal (OLT), when an optical network unit (ONU) is connected to an optical termination point of a customer premises equipment (CPE) of a user, wherein the OLT is installed within an Internet Service Provider (ISP) infrastructure;
   when the ONU is detected as connecting to the optical termination point, notifying, by the OLT, a SDN controller installed at the ISP infrastructure;
   providing, by the SDN controller, access to a single self-provisioning website by the CPE;
   receiving, by the self-provisioning website, credential information identifying the user;
   receiving, by the self-provisioning website, configuration information specifying which FTTH services the user wants to subscribe to; and
   disconnecting, by the SON controller, the user from the self-provisioning website and reconnecting the user to a different network via a virtual customer equipment (vCPE) connected to the ISP infrastructure, wherein the ISP infrastructure is configured to provide access to the Internet and to the specified FTTH services to the user.

2. The method of claim 1, wherein the notifying further comprises sending, by the OLT, an event that activates a temporary vCPE installed within the ISP infrastructure; the SDN controller further connects the temporary vCPE to the CPE and to a service provider site; and the SDN controller further disconnects the user from the self-provisioning website by removing the connection of the temporary vCPE with the CPE and then reconnecting the user to the different network via the vCPE connected to the ISP infrastructure.

3. The method of claim 2, wherein a connection of the temporary vCPE to a customer premises and to the service provider site is performed via two different virtual local area networks (VLANs).

4. The method of 1, wherein the credential information is received via an online registration of the user in the self-provisioning website or via an online or offline means provided by an operator of a dedicated network.

5. The method of claim 1, wherein the CPE is configured in bridge mode or in router mode.

6. The method of claim 1, further comprising: storing, in at least one of a memory or a database, an identification number of the ONU when the user accesses subscribed FTTH services.

7. The method of claim 1, further comprising using a combination of a user identifier, an identifier of the CPE and a network identifier including an identification number of the ONU or of the OLT to use subscribed FTTH services in an additional optical termination point.

8. The method of claim 1, wherein the vCPE is exclusive for the user.

9. The method of claim 1, wherein the vCPE is shared among other users.

10. The method of claim 1, further comprising: applying routing policies when the user accesses subscribed FTTH services.

11. A system for auto-provision of Fiber-to-the-Home (FTTH) access based on Software Defined Networking (SDN), the system comprising:
   an Internet Service Provider (ISP) infrastructure comprising an optical line terminal (OLT), an SDN controller and a virtual customer equipment (vCPE);
   an optical termination point located at a customer premises equipment (CPE) of a user;
   an optical network unit (ONU); and
   a service provider site, wherein
   the OLT is adapted and configured to detect when the ONU is connected to the optical termination point and, when the ONU is detected as connecting to the optical termination point, notify the SDN controller,
   the SDN controller is configured to provide access to a single self-provisioning website by the CPE;
   the self-provisioning website is configured to receive credential information identifying the user on the self-provisioning website;

the self-provisioning website is configured to receive configuration information specifying which FTTH services the user wants to subscribe to;

the SDN controller is configured to disconnect the user from the self-provisioning website and to reconnect the user to a different network via the vCPE; and the ISP infrastructure is configured to provide access to the Internet and to the specified FTTH services to the user.

12. The system of claim 11, wherein the ISP infrastructure further comprises a temporary vCPE configured to be connected to the CPE and to the service provider site in order for the connection to be provided by the SDN controller.

13. A computer program product tangibly embodied in a non-transitory machine-readable storage medium including code instructions that, when executed by at least one processor of a computer system implements the method of claim 1.

14. A computer program product tangibly embodied in a non-transitory machine-readable storage medium including code instructions that, when executed by at least one processor of a computer system implements the method of claim 2.

\* \* \* \* \*